United States Patent
Phillips et al.

(10) Patent No.: US 11,507,932 B2
(45) Date of Patent: Nov. 22, 2022

(54) CARDLESS ATM CONNECTIVITY FOR DENOMINATION SELECTION

(71) Applicant: Capital One Services, LLC, McLean, VA (US)

(72) Inventors: Jeremy J. Phillips, Brooklyn, NY (US); Ehab M. Awadallah, Annandale, VA (US); Christopher Overend, Vienna, VA (US)

(73) Assignee: Capital One Services, LLC, McLean, VA (US)

( * ) Notice: Subject to any disclaimer, the term of this patent is extended or adjusted under 35 U.S.C. 154(b) by 332 days.

(21) Appl. No.: 16/687,180

(22) Filed: Nov. 18, 2019

(65) Prior Publication Data

US 2021/0150497 A1    May 20, 2021

(51) Int. Cl.
*G06Q 20/10*    (2012.01)
*G06Q 20/32*    (2012.01)
(Continued)

(52) U.S. Cl.
CPC ....... *G06Q 20/1085* (2013.01); *G06K 7/1417* (2013.01); *G06K 19/06037* (2013.01);
(Continued)

(58) Field of Classification Search
CPC .......... G06Q 20/1085; G06Q 20/3221; G06Q 20/3224; G06Q 20/3276; G06K 7/1417; G06K 19/06037
See application file for complete search history.

(56) References Cited

U.S. PATENT DOCUMENTS

| 9,922,370 B2 | 3/2018 | Kobres et al. |
| 10,332,358 B1 | 6/2019 | Burks et al. |

(Continued)

OTHER PUBLICATIONS

Hellmann, R. (Mar. 15, 2018). In a mobile banking era, the ATM is more important than ever. ATM Marketplace.News Features Retrieved from https://dialog.proquest.com/professional/docview/2014047711?accountid=131444 on Jul. 22, 2022 (Year: 2018).*

*Primary Examiner* — Kito R Robinson
(74) *Attorney, Agent, or Firm* — Sterne, Kessler, Goldstein & Fox P.L.L.C.

(57) ABSTRACT

Disclosed herein are system, method, and computer program product embodiments for providing denomination selection capabilities to account holders withdrawing funds via a cardless ATM system. An account holder may queue an ATM withdrawal in desired monetary denominations from a mobile application running on their mobile device. The account holder may subsequently scan a QR code displayed at an ATM using the mobile application and receive the desired monetary denominations from the ATM, all without using an ATM card. Two other approaches are provided to an account holder when queueing an ATM withdrawal that includes denominations. In a denomination-driven request, the account holder selects denominations first and then receives a list of proximate ATMs that can satisfy the denomination request. In a location-driven request, the account holder selects an ATM first and then can tailor the denomination request to the denominations available in the selected ATM.

20 Claims, 10 Drawing Sheets

(51) Int. Cl.
*G06K 7/14* (2006.01)
*G06K 19/06* (2006.01)

(52) U.S. Cl.
CPC ..... *G06Q 20/3221* (2013.01); *G06Q 20/3224* (2013.01); *G06Q 20/3276* (2013.01)

(56) References Cited

U.S. PATENT DOCUMENTS

| | | |
|---|---|---|
| 10,339,507 B2 | 7/2019 | Koeppel et al. |
| 2008/0149706 A1* | 6/2008 | Brown ................... G06Q 40/12 235/379 |
| 2010/0174640 A1* | 7/2010 | Cole ...................... G06Q 20/10 705/39 |
| 2013/0110718 A1* | 5/2013 | Al-Azzawi ............ G06Q 40/02 705/43 |
| 2013/0124411 A1* | 5/2013 | Kobres ................... G07F 19/20 705/43 |
| 2016/0371661 A1* | 12/2016 | Shah ..................... G06Q 10/105 |
| 2017/0124544 A1* | 5/2017 | Recriwal ............... G06Q 20/385 |
| 2018/0053173 A1 | 2/2018 | Ballout |
| 2018/0285843 A1* | 10/2018 | Chaturvedi ........... G07F 19/203 |
| 2018/0341934 A1* | 11/2018 | Rodrigues ............. G07F 19/209 |
| 2019/0164165 A1 | 5/2019 | Ithabathula |

* cited by examiner

CARDLESS ATM CONNECTIVITY FOR DENOMINATION SELECTION

BACKGROUND

Increasingly, bank account holders conduct banking transactions via mobile device applications. From a mobile application, account holders may perform many different types of banking transactions, such as checking balances, transferring funds, and viewing statements. However, occasionally, bank account holders must visit an Automated Teller Machine (ATM) to finalize transactions that cannot be completed on the mobile application, such as performing a cash withdrawal.

BRIEF DESCRIPTION OF THE DRAWINGS

The accompanying drawings, which are incorporated herein and form a part of the specification, illustrate embodiments of the present disclosure and, together with the description, further serve to explain the principles of the disclosure and to enable a person skilled in the arts to make and use the embodiments.

FIGS. 2A through 2J illustrate wireframes of mobile device interactions with a cardless ATM system, in accordance with an embodiment.

In the drawings, like reference numbers generally indicate identical or similar elements. Additionally, generally, the left-most digit(s) of a reference number identifies the drawing in which the reference number first appears.

DETAILED DESCRIPTION

Figure 1:
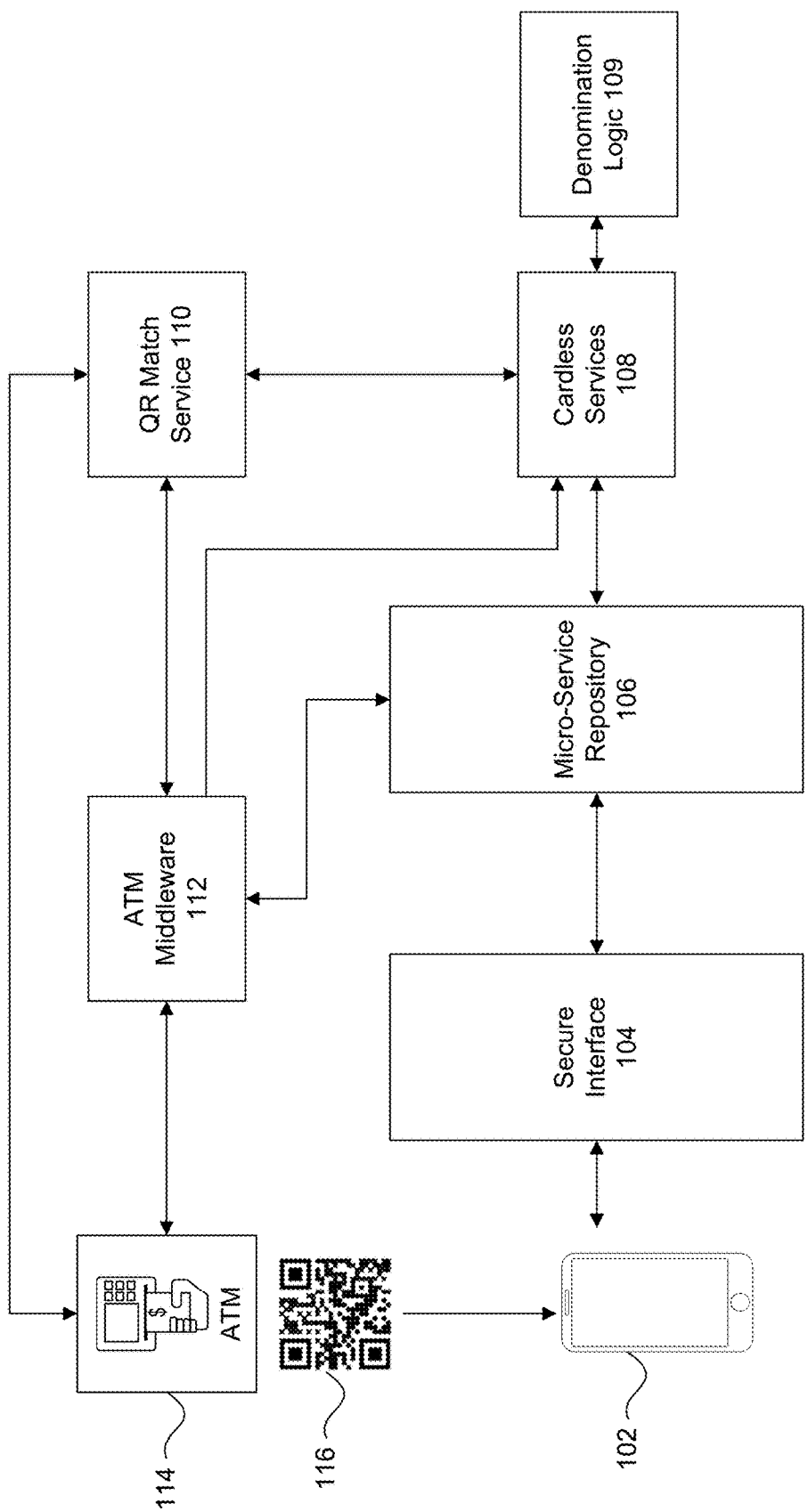
FIG. 1 is a block diagram of a cardless ATM system, in accordance with an embodiment.

Provided herein are system, apparatus, device, method and/or computer program product embodiments, and/or combinations and sub-combinations thereof, for providing denomination selection capabilities to account holders withdrawing funds via a cardless ATM system.

A bank may offer a mobile application experience that allows account holders to conduct banking transactions via a mobile device. For example, an account holder may use a mobile banking application to check account balances, change their user information, transfer funds between accounts, pay bills from stored funds, etc. As part of this mobile application experience, the bank may provide a cardless ATM feature. Through a cardless ATM system, an account holder may use the mobile application to pre-stage a transaction at an ATM, e.g., a cash withdrawal. Then, the account holder may visit an ATM, scan a barcode or other suitable signifier at the ATM using the mobile device for authentication, and complete the transaction at the ATM without presenting an ATM card and PIN number.

Another desirable feature for banking customers is the ability to specify denominations of money when withdrawing funds. For instance, some account holders may prefer large denominations, e.g., $50 bills or $100 bills. Some account holders may prefer small denominations of money for their withdrawals, e.g., $5 bills or $10 bills. Other account holders may prefer to receive a variety of denominations in a withdrawal to cover a range of potential, future purchases. This ability to choose the desired denomination or select a combination of denominations when withdrawing funds is a marketable feature.

However, legacy systems may not allow an account holder to create a denomination request after scanning a QR code at an ATM. Legacy systems may lack the ability to track the denominations of money found in ATMs in real-time or near-real-time and to provide this information to account holders in a streamlined and integrated fashion. Often, an account holder may not know the denominations of money available in a particular ATM until the account holder inserts an ATM card in the ATM and begins conducting an in-person withdrawal transaction. Furthermore, legacy systems may not allow an account holder to build a denomination request that specifies a combination of denominations and select an ATM based on the denomination request prior to visiting the ATM. Finally, legacy systems may not allow an account holder to tailor a denomination request based on the denominations available at a selected ATM.

Accordingly, a need exists to offer denomination selection capabilities within a cardless ATM system. In one embodiment, by receiving the denomination request before the account holder visits an ATM, the system may consider the available denominations across numerous ATMs to determine the ATM(s) that the account holder may use to satisfy the denomination request. In another embodiment, an account holder may also build a denomination request in the mobile experience that matches an ATM that is selected from a list of proximate ATMs. In another embodiment, an account holder may scan a QR code at an ATM and then create a denomination request tailored to the denominations at that ATM.

This provides a technical improvement by offering an account holder varied options by which to pre-stage and ATM transaction and to receive desired monetary denominations from an ATM. This provides a technical improvement by reducing the number of transactions at the ATM that are needed to withdraw the desired bills, thereby streamlining and optimizing the withdrawal process. This provides a further technological improvement of improved security by allowing an account holder to complete a withdrawal without using an ATM card and PIN. This provides another technical improvement by allowing the account holder to be informed of problems with the ATM even when the ATM becomes inoperable.

FIG. 1 is a block diagram of cardless ATM system 100, in accordance with an embodiment. Any operation herein may be performed by any type of structure in the diagram, such as a module or dedicated device, in hardware, software, or any combination thereof. Any block in the block diagram of FIG. 1 may be regarded as a module, apparatus, dedicated device, general-purpose processor, engine, state machine, application, functional element, or related technology capable of and configured to perform its corresponding operation(s) described herein. Cardless ATM system 100 may include mobile device 102, secure interface 104, micro-service repository 106, cardless services 108, denomination logic 109, QR match service 110, ATM middleware 112, ATM 114, and QR code 116.

Mobile device 102 may be a personal digital assistant, netbook, tablet, smart phone, mobile phone, smart watch or other wearable, appliance, part of the Internet-of-Things, and/or embedded system, to name a few non-limiting examples, or any combination thereof. In other embodiments, mobile device 102 may be a desktop workstation, laptop or notebook computer, or other suitable computing device. Mobile device 102 may be used by a bank account holder to conduct online banking, e.g., check account balances, transfer funds, and perform a litany of other banking-related transactions. Mobile device 102 may include a mobile application installed thereon, which may be used to interact with a banking institution and banking systems when performing banking transactions.

Secure interface 104 may facilitate interactions between a mobile application on mobile device 102, the banking institution, and other system components. Secure interface 104 may provide facilities that allow various system components, including mobile device 102 and/or a mobile application running thereon, to securely communicate with a banking institution's backend systems to conduct transactions while protecting the banking institution's backend systems from improper access attempts, e.g., distributed denial of service (DDoS) attacks, injection attacks, etc. Secure interface 104 may harness and leverage various communication standards and protocols, e.g., TLS, SSL, HTTP, HTTPS, etc., to enhance communication between and among various components in cardless ATM system 100 and backend banking systems.

Micro-service repository 106 may provide a variety of micro-services that furnish capabilities within and across cardless ATM system 100. To provide these services and functions, micro-service repository 106 may employ suitable lightweight network protocols, e.g., HTTP, and provide specific, tailored functions, modules, messaging protocols, etc. to actors and software modules within cardless ATM system 100. For example, micro-service repository 106 may provide functions and methods that allow mobile device 102 to interact with ATM 114 without using a physical ATM card. In one embodiment, for example, micro-service repository 106 may provide services that allow an account holder to pre-stage a withdrawal transaction at ATM 114 via a mobile application running on mobile device 102. Micro-services 106 may also facilitate interactions between mobile device 102 and denomination logic 109 in the creation and fulfillment of denomination requests. Micro-services 106 may provide additional features, functions, and services to fulfill a variety of requirements and use cases within cardless ATM system 100 at a scalable and efficient level.

Cardless services 108 may provide a wide-array of services, APIs, functions, etc. that allow a mobile application running on mobile device 102 to perform various actions and transactions in cardless ATM system 100. For example, cardless services 108 may facilitate the reception of an identifier corresponding to an ATM, such as ATM 114, from a mobile application running on mobile device 102. For example, a mobile application running on mobile device 102 may scan a QR code, described in further detail below as QR code 116, displayed on a display of an ATM, decode an identifier for the ATM encoded in the QR code via QR match service 110, and send the identifier to cardless services 108.

QR code 116 may be a barcode or other coding mechanism that may be scanned by mobile device 102 (e.g. by accessing a camera feature built into mobile device 102). QR Code 116 may encode an identifier that uniquely identifies ATM 114. QR match service 110 may derive the unique identifier from QR code 116 and return the unique identifier to mobile device 102 and/or send the unique identifier to cardless services 108. Cardless services 108 may then be able to pair a transaction initiated from mobile device 102 with ATM 114 specifically on the basis of the unique identifier.

Cardless services 108 may facilitate the creation of a denomination request from the mobile application after receiving the identifier, as described in further detail below. Cardless services 108 may subsequently direct ATM 114 to complete the withdrawal transaction in the specified denominations. In addition to withdrawals, cardless services 108 may create and store a variety of other transactions performable within cardless ATM system 100, e.g., fund transfers, deposits, etc. Since the banking institution knows that an authenticated account holder has proper access to perform the transaction, even without the use of an ATM card, cardless services 108 may inform ATM 114 that the authenticated user is permitted to complete the transaction at ATM 114. From an account holder's perspective, this functionality eliminates the need to carry an ATM card in addition to their mobile device.

In one embodiment, cardless services 108 may pre-stage a withdrawal at ATM 114. This allows the account holder to visit ATM 114, scan the QR code or other barcode, and receive their funds with minimal interaction with ATM 114 and without providing an ATM card and PIN number. Cardless services 108 may pre-stage the withdrawal in accordance with a received denomination request, described in further detail throughout the disclosure below. For a pre-staged withdrawal, cardless services 108 may use ATM middleware 112 to prepare the distribution of denominations from ATM 114, for example, by setting the funds aside or otherwise preserving the funds. As an additional benefit of pre-staging the withdrawal, cardless services 108 and/or denomination logic 109 may track future withdrawals and denominations that may occur at ATM 114. For example, denomination logic 109 may access the quantity of each denomination across a range of ATMs and subtract from these current denomination counts any queued withdrawals/denomination requests to determine a functional or operative quantity of each denomination. Thus, when denomination logic 109 receives a denomination request, the functional or operational quantity for each denomination may be used when calculating whether the ATM can satisfy the denomination request. This functional or operational quantity allows the Cardless ATM system to avoid, obviate, and address situations where an account holder creates a denomination request but then finds upon arriving at the ATM that the denomination request can no longer be fulfilled. For example, cardless services 108 may send mobile device 102 a push notification when a selected ATM can no longer perform a pre-staged transaction or allow an account holder to reconfigure a second denomination request to replace the first denomination request.

Denomination logic 109 may provide capabilities that allow mobile device 102 to create a denomination request when queueing a withdrawal in cardless ATM system 100. Denomination logic 109 may store information about ATMs such as the location of the ATM, the types of denominations available at the ATM, hours of operation, branch contact information, etc. Denomination logic 109 may also track the number of each denomination available at each ATM in real-time or near-real-time by employing micro-service repository 106 and/or ATM middleware 112. Specifically, denomination logic 109 may send an API request, micro-service request, etc. to one or more ATMs at various points in time and receive in return an indicator of the quantity of each denomination that is available at those ATMs. In one embodiment, denomination logic 109 may periodically send such requests to keep the internally tracked information current. In another embodiment, denomination logic 109 may query the available denominations on an ad-hoc basis, i.e., request denomination information from the ATMs when servicing a denomination request. Denomination logic 109 may in turn provide access to the catalogued ATM information to other features and aspects provided by cardless services 108 through API calls, functions, modules, etc.

Denomination logic 109 may enforce a variety of rules against a received denomination request. For instance, denomination logic 109 may compare the total value of the received denomination request to the total value of the withdrawal to ensure that the two values match. In another embodiment, denomination logic 109 may determine the total value of the withdrawal by summing the denominations in the denomination request, obviating the need for duplicative entry of monetary values by an account holder. In some embodiments, denomination logic 109 may apply account-based restrictions to limit the number of bills for each denomination that an account holder may receive during a particular time period.

In the below disclosure, denomination requests may be made in at least three different ways. In a first approach, a denomination-driven request, an account holder may view a list of ATMs capable of satisfying a desired denomination request. In a second approach, a location-driven request, an account holder may tailor their denomination requests to the available denominations at an ATM selected from a list of proximate ATMs. In a third approach, a scan-driven approach, a user may generate a denomination request after scanning a QR code displayed on an ATM.

In a denomination-driven request, denomination logic 109 may first receive from an account holder the desired denominations for a withdrawal. For instance, an account holder may specify the number of $5 bills to receive, the number of $10 bills to receive, the number of $20 bills to receive, the number of $50 bills to receive, and the number of $100 bills to receive. In one embodiment, denomination logic 109 may receive these denominations and determine the withdrawal amount by summing the received denominations. In another embodiment, denomination logic 109 may receive the desired denominations after the total withdrawal amount is entered and compare the values to ensure that the values match. After receiving the desired denominations, denomination logic 109 may compare the desired denominations to the denominations that are available at proximate ATMs to determine a list of ATMs in the account holder's vicinity that are capable of fulfilling the desired denomination request. For example, if an account holder requests to withdraw $20 total and to receive the withdrawal via four $5-dollar bills, denomination logic would limit the list of ATMs displays to the account holder to those ATMs that both dispense $5-dollar bills and that have at least four $5-dollar bills in stock. In some embodiments, denomination logic 109 may consider other queued cardless ATM transactions to determine a functional or operational amount of each denomination at each ATM. Denomination logic 109 may then provide the list of suitable ATMs to the account holder in a suitable format, e.g., a list view, a map view, etc. Denomination logic 109 may receive additional filtering, sorting, grouping, etc. from the account holder to refine or expand the list of ATMs. At this point, the account holder may select an ATM that he or she intends to visit. Or an account holder may avoid selecting a specific ATM, in such case the withdrawal transaction may persist until the account holder visits an ATM and scans a QR code on ATM 114 with mobile device 102 to identify the visited ATM. In such case, the cardless services 108 may receive the identifier for the ATM from the mobile application and/or QR match service 110 and direct the ATM to provide the withdrawal amount in the one or more denominations specified in the denomination request.

In a location-driven request, denomination logic 109 may first provide an account holder with a list of ATMs in the vicinity of mobile device 102. In other embodiments, denomination logic 109 may provide the initial list of ATMs based on other suitable criteria, e.g., frequently visited ATMs, popular ATMs, user-entered criteria, etc. Denomination logic 109 may present this list of ATMs to the account holder in a list, map-view, or other suitable interface construct. Denomination logic 109 may receive additional filtering, sorting, grouping, etc. to refine or expand the list of ATMs. In an embodiment, denomination logic 109 may allow the account holder to filter the list on the basis of the available denominations, e.g., to display only ATMs that currently have $5 bills in stock. The account holder may then select a desired ATM from the list of ATMs. After selecting the desired ATM, denomination logic 109 may then proceed to receive a denomination request from the account holder. In the location-driven request, by receiving the desired ATM up front, denomination logic 109 may limit the denomination request to only those denominations that are available in the selected ATM. For instance, if the account holder selects an ATM that only includes $10 and $20 bills, the denomination request may be limited to some combination of $10 and $20 bills.

In a scan-driven request, denomination logic 109 may allow an account holder to create a denomination request after cardless services 108 receives an ATM identifier. The ATM identifier may be received from a mobile application running on mobile device 102. For example, a mobile application running on mobile device 102 may scan a QR code displayed on a display of an ATM, decode an identifier for the ATM encoded in the QR code via QR match service 110, and send the identifier to cardless services 108. Once the ATM is identified, denomination logic 109 may facilitate the creation of a denomination request from the mobile application, wherein the account holder may tailor the denomination request to those denominations included in the ATM corresponding to the scanned QR code. Cardless services 108 may subsequently direct ATM 114 via ATM middleware 112 to complete the withdrawal transaction in the specified denominations.

In some embodiments, if a change in circumstances occurs, and the denomination request cannot be fulfilled by a selected ATM, cardless services 108 may send a push notification to mobile device 102 informing the account holder of the problem. Such a happenstance may occur, for instance, if another banking customer performs a withdrawal at ATM 114 that removes denominations that were earmarked for a queued withdrawal. Such a push notification may inform the account holder of the occurrence and allow the account holder to cancel the queued transaction or specify an updated denomination request. In another embodiment, cardless services 108 may employ denomination logic 109 to receive a second denomination request to replace the first denomination request based on the changed circumstances.

QR match service 110 may be employed by cardless services 108 and/or mobile device 102 to determine a unique identifier for ATM 114. This unique identifier for ATM 114 may be encoded in barcode, e.g., QR code 116, and may be available to be scanned or captured by mobile device 102 at ATM 114. In an embodiment, QR match service 110 may receive QR code 116, decode the unique identifier for ATM 114 that is encoded in the QR code, and pass the unique identifier to mobile device 102 and/or cardless services 108.

Cardless services 108 may issue a request to ATM 114 to perform a specific transaction pre-staged by the account holder on a mobile application running on mobile device 102, e.g., providing cash to complete a cash withdrawal transaction. Instructions may be provided to ATM 114 through ATM middleware 112 to direct the behavior of ATM 114. In accordance with an embodiment, cardless services 108 may pair transactions from mobile device 102 with ATM 114 in response to the reception of an ATM identifier, which can be derived by a mobile application running on mobile device 102 by scanning a QR code displayed on ATM 114 via QR match service 110. For example, ATM 114 may display a barcode, such as QR code 116, on a display screen. This barcode may encode or otherwise include an identifier associated with ATM 114. In one embodiment, denomination logic 109 may receive a denomination request from the mobile application after the QR code is scanned and the ATM is identified. In this fashion, denomination logic 109 may tailor the available denominations for the denomination request to those denominations available in the identified ATM.

Figure 2B:
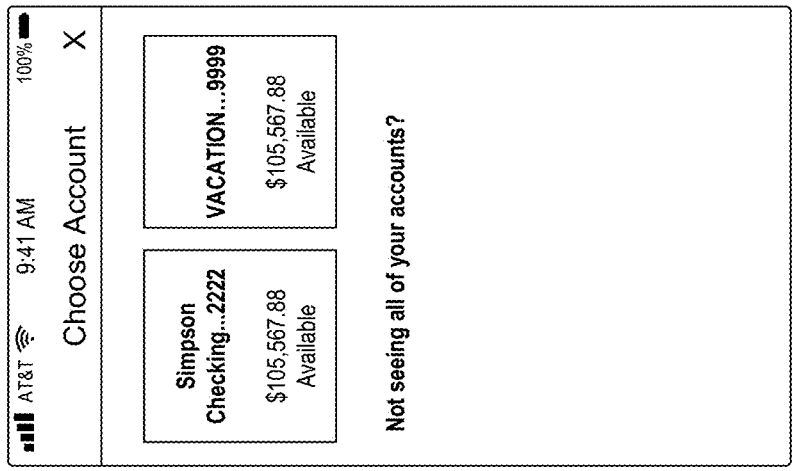
Figure 2A:
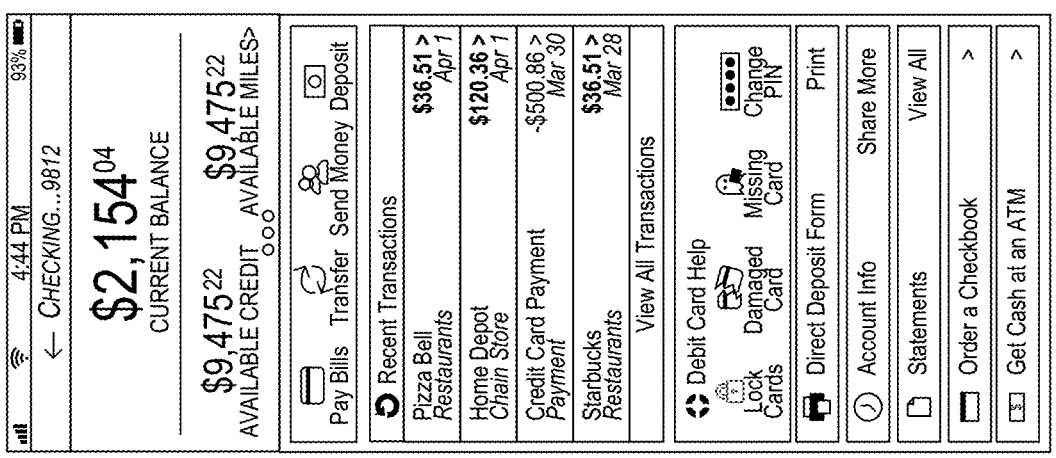
Figures 2C, 2D:
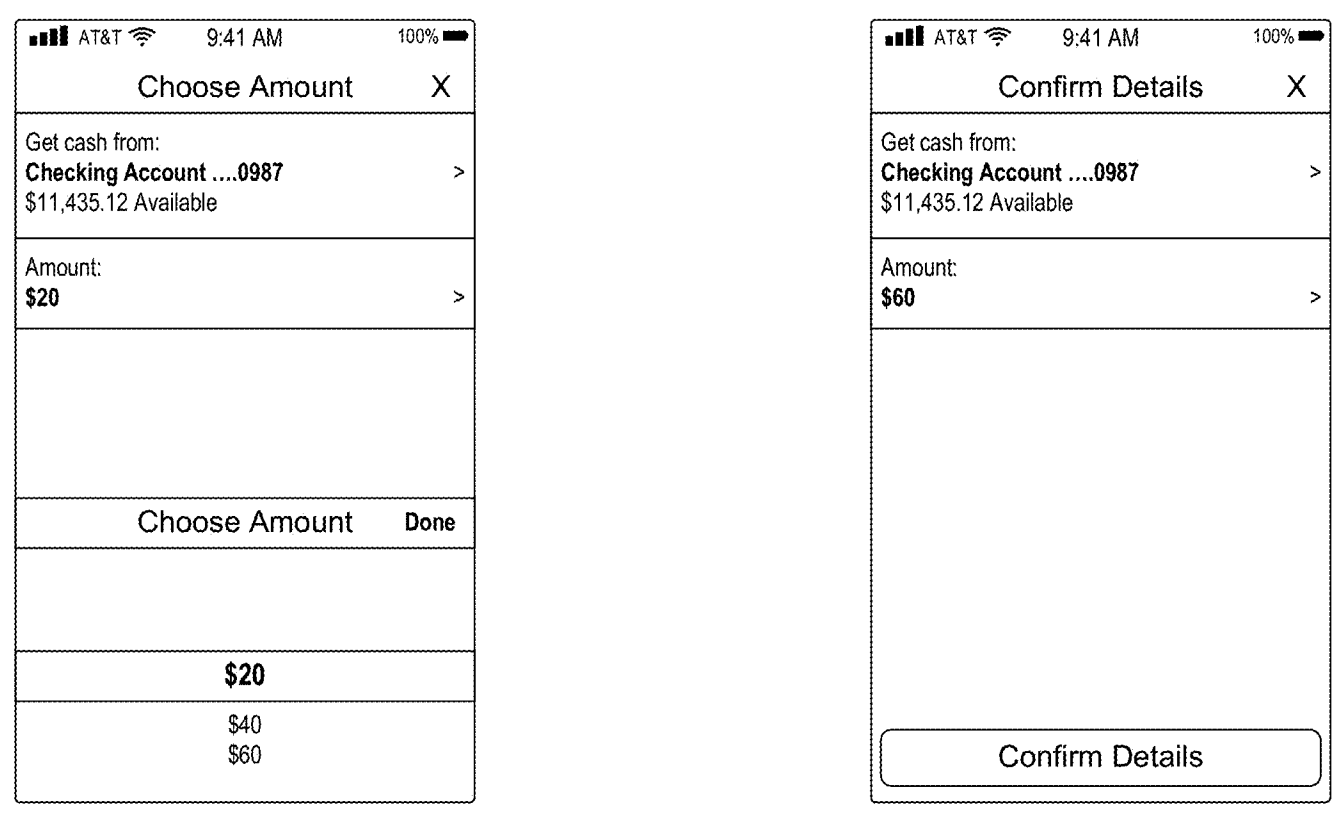
Figure 2F:
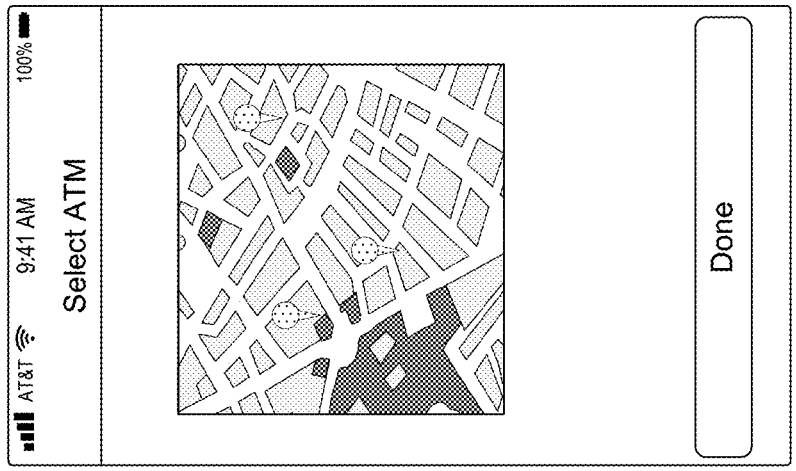
Figure 2E:
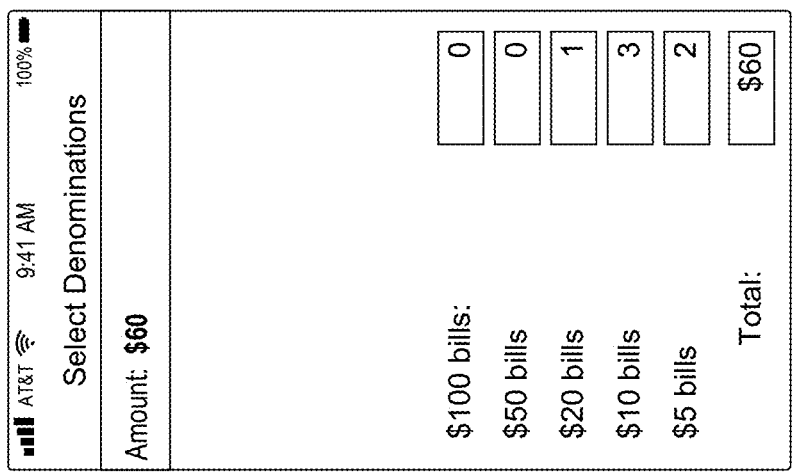
Figure 2H:
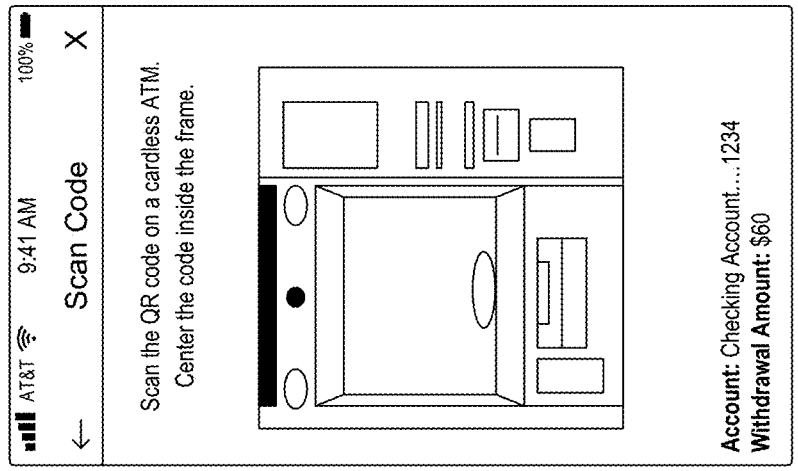

FIGS. 2A through 2J illustrate wireframes of mobile device interactions with a cardless ATM system, in accordance with an embodiment. These wireframes are merely exemplary, and one skilled in the relevant art(s) will appreciate that many approaches may be taken to provide mobile applications and user interfaces in accordance with this disclosure. FIGS. 2A through 2J illustrate a process of preparing a transaction for fulfillment at ATM 114. FIGS. 2E and 2F illustrate a portion of the process involving the entry of a denomination request by an account holder using a mobile application.

FIG. 2A shows an exemplary home screen for a mobile application used for banking from a mobile device, such as mobile device 102 of FIG. 1. From this screen, an account holder may commence a multitude of transactions within cardless ATM system 100. For example, an account holder may click the "Transfer" icon to transfer funds between accounts. Or an account holder may click "Change PIN" to change their ATM PIN number. For further example, the subsequent wireframes depicted in FIGS. 2B through 2J, may be presented after an account holder clicks "Get Cash at an ATM." These wireframes portray the withdrawal of funds from an ATM using a cardless ATM system, such as cardless ATM system 100.

FIG. 2B shows an exemplary screen allowing an account holder to select an account from which to perform the withdrawal. In an embodiment, the screen in FIG. 2B may be displayed to the mobile user after the account holder clicks "Get Cash at an ATM" in the screen display showed in FIG. 2A. The displayed accounts may include checking accounts, savings accounts, retirement accounts, brokerage accounts, health-savings accounts, and any other suitable accounts held by an account holder at a banking institution. An account holder may click, select, or otherwise indicate or communicate the selection of an appropriate account from among their stored accounts. In an embodiment, if an account holder only has one account, the account-selection step may be skipped.

FIG. 2C shows an exemplary screen for entering a withdrawal amount. In an embodiment, this exemplary screen may be provided to the account holder after the account holder selects an appropriate account from the accounts screen displayed in FIG. 2B. In an embodiment, this step may be skipped if the account holder creates a denomination request, with the total withdrawal amount being determined by cardless services 108 by summing the denominations specified in the denomination request.

FIG. 2D shows an exemplary screen for confirming the details of the withdrawal, including the account and the amount selected. In one embodiment, FIG. 2D may be displayed after the mobile user chooses an amount in FIG. 2C. In another embodiment, FIG. 2D may display after receiving the denomination request from the account holder. In this embodiment, the screen may also display a confirmation of the desired denominations.

FIG. 2E may be an exemplary screen for configuring the details of a denomination request. In one embodiment, FIG. 2E may display after an account holder enters the withdrawal amount as displayed in FIG. 2D. In another embodiment, the entry of the denomination request may replace the entry of a total withdrawal amount. An account holder may enter the number of each denomination to receive in the withdrawal through a suitable input mechanism. For example, FIG. 2E displays editable fields, but these inputs could also be dropdown menus, sliders, or other suitable constructs. In an embodiment, default values may be entered when an account holder arrives at the denomination request page. For example, for a $60 withdrawal, the denominations may be prepopulated with suitable values, e.g., three $20 bills.

In an embodiment, FIG. 2F may be an exemplary screen for selecting a particular ATM that can meet the requirements of the provided denomination request, i.e., to satisfy a denomination-driven request. FIG. 2F displays a map-based display for the list of ATMs. However, other embodiments may display the list of ATMs using a different approach. When the user selects a particular ATM in the denomination-driven request approach, a withdrawal of the denominations in the denomination request may be staged at the selected ATM.

In another embodiment, for a location-driven request, the ordering of the screen display in FIG. 2F and FIG. 2E may be reversed, with an account holder first viewing the screen in FIG. 2F to select an appropriate ATM machine from a list of proximate ATMs. In the location-driven request approach, after selecting an ATM machine, the account holder may be routed to the screen in FIG. 2E. However, denomination logic 109 may limit the available denominations to those denominations available at the selected ATM. In some embodiments, though an account holder selected an ATM to visit to receive the withdrawal, the account holder may visit ultimately scan a QR code at a different ATM using mobile device 102. In such an instance, denomination logic 109 may send a push notification to the mobile device informing the account holder that the visited ATM does not match the pre-staged ATM. However, cardless ATM system 100 may satisfy the denomination request, if possible, provide the account holder with the ability to provide an updated denomination request, or satisfy the withdrawal amount using alternative denominations.

In another embodiment, for a scan-driven request, an account holder might not view the screen in FIG. 2F. Instead, such an account holder might scan a QR code displayed at an ATM and send an identifier decoded from the QR code to cardless services 108. Such an account holder may subsequently complete a denomination request based on the capabilities of the identified ATM.

Figure 2G:
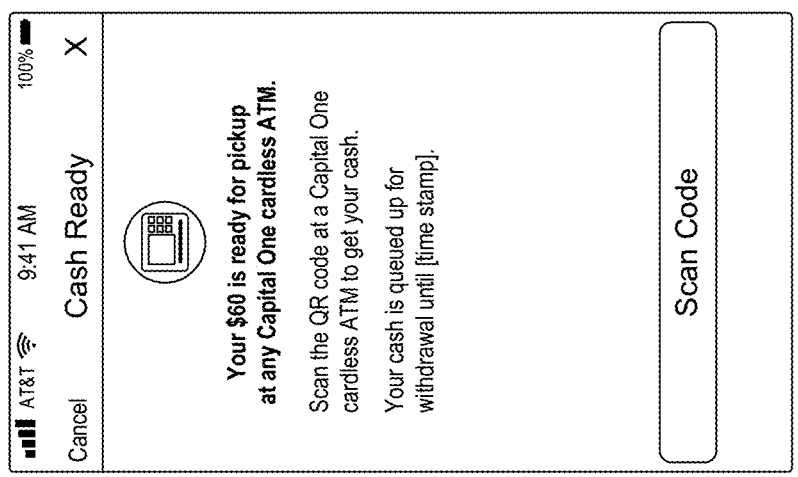
Figure 2J:
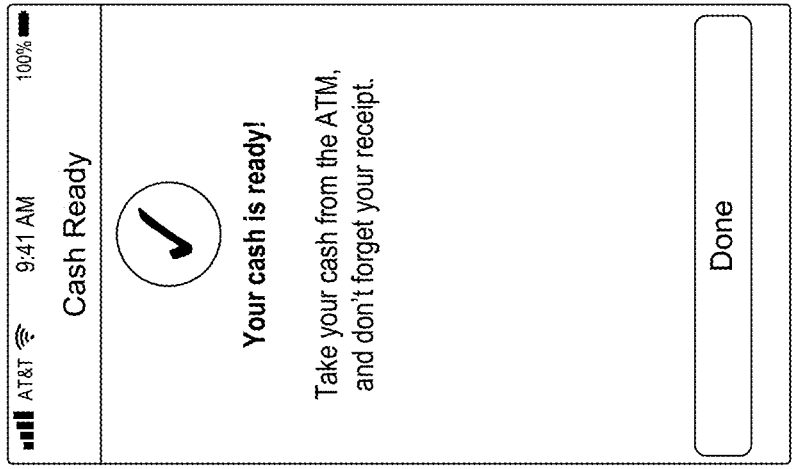
Figure 2I:
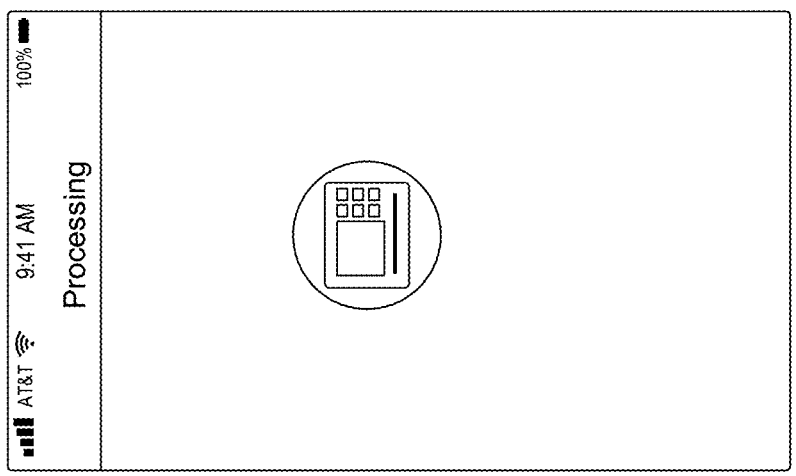

FIG. 2G shows an exemplary screen notifying the account holder that the transaction has been approved and is ready to be completed at an ATM. This screen also provides an option allowing the user to scan a QR code, which, once selected, navigates to the exemplary screen of FIG. 2H. FIG. 2I shows a camera feature allowing the user to approach the ATM with their mobile device to scan the code (e.g., a QR code) shown on the ATM display. FIG. 2J shows a confirmation screen indicating that the transaction has been completed by the ATM.

Figure 3:
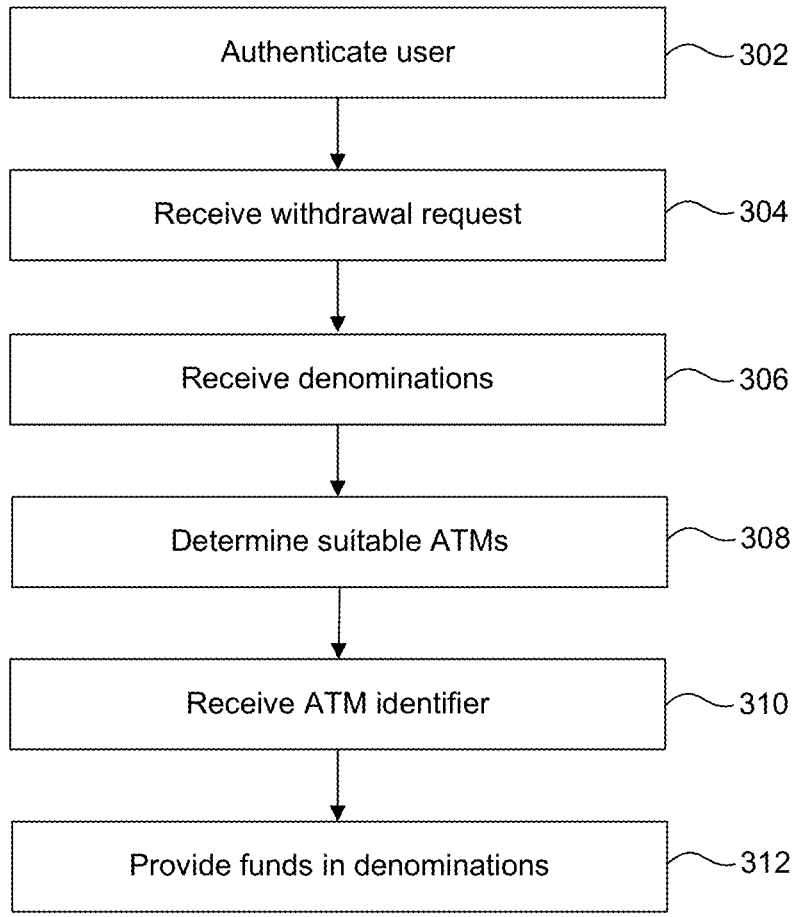
FIG. 3 illustrates a method of receiving a denomination-driven request to withdraw funds in a cardless ATM system, in accordance with an embodiment.

FIG. 3 illustrates a method 300 of receiving a denomination-driven request to withdraw funds in a cardless ATM system, in accordance with an embodiment. In the denomination-driven approach, denomination logic 109 receives the denomination request first and determines a list of ATMs that can service the received denomination request. Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art(s).

In 302, cardless services 108 may authenticate an account holder on mobile device 102 via secure interface 104 and/or micro-service repository 106. For example, cardless services 108 may receive a login and password from mobile device 102 and compare the received password to stored, encrypted passwords associated with the account holder. If the received login and password match, then the account holder may be considered authenticated. In other embodiments, cardless services 108 may authenticate the account holder using biometric data, e.g., fingerprint or eye scans, or other suitable authentication methods. Cardless services 108 services may also employ secondary authentication methods such as two-factor authentication, security-question verification, one-time passcodes, etc. to further verify the identity of the account holder.

In 304, cardless services 108 may receive a withdrawal request from the authenticated account holder. For example, an account holder may click "Get Cash From ATM" or other suitable link in a mobile application such as the mobile application displayed in FIG. 2A. Then cardless services 108 may receive a selection of a particular account and a withdrawal amount. In an embodiment, cardless services 108 may not receive the withdrawal amount from the user, and instead, cardless services 108 may sum the withdrawal amount based on the denominations in the received denomination request (described below in later steps). Cardless services 108 may check the available funds within the selected account to determine if the account possesses adequate funds to satisfy the withdrawal request. Cardless services 108 may impose various limits and rules upon the withdrawal, e.g., ensure that the daily withdrawal limit is not exceeded by the transaction. Cardless services may formulate an appropriate error message or otherwise fail gracefully if inadequate funds exist in the account or the account holder would exceed applicable limitations.

In 306, cardless services 108 may employ denomination logic 109 to receive the desired denominations from the account holder, i.e., facilitate the creation of the denomination request. The denomination request may specify the number of $5 bills, $10 bills, $20 bills, $50 bills, $100 bills, etc. to be received in the withdrawal. Although the foregoing lists dollars, other currencies, denominations, etc. may be specified. Denomination logic 109 may employ a suitable user interface to receive these denominations. One such interface is described above with reference to FIG. 2E. Denomination logic 109 may provide additional error checking at this point to ensure that a daily limit for each denomination associated with the account holder is not being exceeded. In one embodiment, method 300 may perform above-described steps 304 and 306 coextensively. In this embodiment, denomination logic 109 may receive the denomination request and cardless services 108 may determine the withdrawal amount by summing the values in the denomination request. This embodiment spares the account holder from having to add redundant or duplicative information.

In 308, denomination logic 109 may determine a list of ATMs that are capable of fulfilling the denomination request received in 306. An initial list of ATMs may be determined based on proximity, distance, usage-frequency, and a range of other factors. Denomination logic 109 may refresh information about the denominations that are available at each ATM in the list of ATMs using micro-service repository 106 and/or ATM middleware 112 to ensure the accuracy of the calculations. For example, denomination logic 109 may send a request to each ATM to report back with the number of each denomination that is available at that ATM and then update catalogued information based on these responses. Denomination logic 109 may further update the catalogued information by considering ATM withdrawals and denomination requests queued by other users. Using updated denomination information, denomination logic 109 may compare the denominations requested in 306 to the denominations that are available at each ATM in the list of ATMs. Based on this information, denomination logic 109 may remove from the list of ATMs those ATMs that are unable to fulfill the denomination request. For instance, some ATMs may not dispense $5 bills. If a denomination request specified $5 bills, any ATM not dispensing $5 bills may be removed from the list of ATMs. Denomination logic 109 may then present the narrowed list of ATMs to the account holder via cardless services 108. In an embodiment, the account holder may then select a particular ATM from among the list of ATMs to pre-stage the transaction at that particular ATM. In another embodiment, the account holder may travel to the displayed ATM without selecting the particular ATM.

In 310, an account holder with mobile device 102 approaches ATM 114 and scans a barcode, QR code, or other suitable label at the ATM using the mobile application. Such a barcode may encode or otherwise include some form of identifier for the ATM. As previously discussed, this barcode may be, for example, a QR code, although a skilled artisan would appreciate that other methods of encoding an identifier for the ATM may be used and other methods of transmitting the same to the mobile app may also be used. The mobile application may then send the scanned barcode to QR match service 110 to determine a unique identifier for the ATM. In an embodiment, the account holder may not select a particular ATM to pre-stage the transaction in 308, and in this embodiment, the account holder may visit the ATM and scan the QR code without pre-staging the transaction at an ATM or selecting an ATM. In this embodiment, the withdrawal may still occur in the requested denominations if available. If the requested denominations are not available, denomination logic 109 may send a push notification to the account holder informing the account holder of the problem, and denomination logic 109 may receive an updated denomination request applicable to the visited ATM.

In 312, cardless services 108 may request processing of a queued transaction at the ATM associated by employing ATM middleware 112. Cardless services 108 may further interact with backend banking systems to complete the transaction, in embodiments and use cases where an ATM visit is not required.

In this fashion, a withdrawal may be provided to the account holder that matches the queued denomination request without requiring the account holder to present an ATM card and PIN number. Moreover, the system may consider the available denominations across a range of proximate ATMs to determine the ATM(s) that the account holder may visit to satisfy the denomination request, and the account holder is assured that the ATM will have those denominations upon visiting the ATM to complete the withdrawal.

Figure 4:
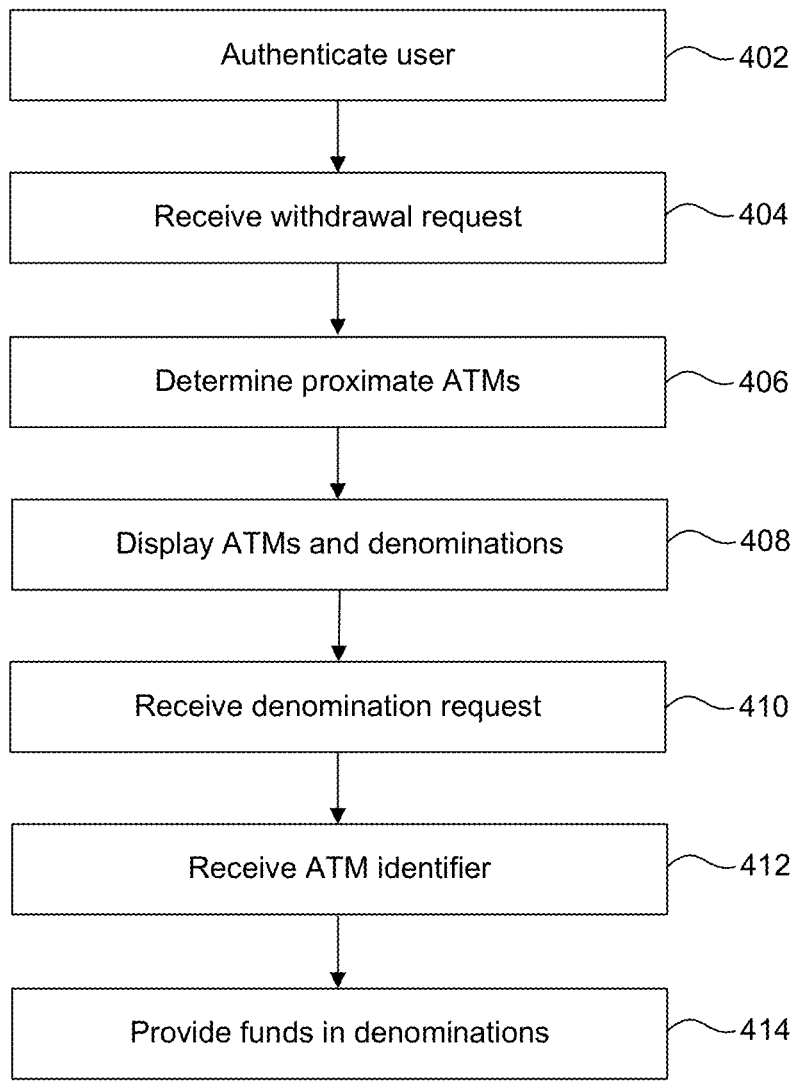
FIG. 4 illustrates a method of receiving a location-driven request to withdraw funds in a cardless ATM system, in accordance with an embodiment.

FIG. 4 illustrates a method 400 of receiving a location-driven request to withdraw funds in a cardless ATM system, in accordance with an embodiment. In the location-driven request approach, denomination logic 109 determines an ATM first, and then receives a denomination request that limits the denominations to the capabilities of the selected ATM. Method 400 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art(s).

In 402, cardless services 108 may authenticate an account holder on mobile device 102 via secure interface 104 and/or micro-service repository 106. For example, cardless services 108 may receive a login and password from mobile device 102 and compare the received password to stored, encrypted passwords associated with the account holder. If the received login and password match, then the account holder may be considered authenticated. In other embodiments, cardless services 108 may authenticate the account holder using biometric data, e.g., fingerprint or eye scans, or other suitable authentication methods. Cardless services 108 services may also employ secondary authentication methods such as two-factor authentication, security-question verification, one-time passcodes, etc. to further verify the identity of the account holder.

In 404, cardless services 108 may receive a withdrawal request from the authenticated account holder. For example, an account holder may click "Get Cash From ATM" or other suitable link in a mobile application such as displayed in FIG. 2A. Then cardless services 108 may receive a selection of a particular account and a withdrawal amount. In an embodiment, cardless services 108 may not receive the withdrawal amount from the user, and instead, cardless services 108 may sum the withdrawal amount based on the denominations in the received denomination request (described below in later steps). Cardless services 108 may check the available funds within the selected account to determine if the account possesses adequate funds to satisfy the withdrawal request. Cardless services 108 may impose various limits and rules upon the withdrawal, e.g., ensure that the daily withdrawal limit is not exceeded by the transaction. Cardless services 108 may formulate an appropriate error message or otherwise fail gracefully if inadequate funds exist in the account or the account holder would exceed applicable limitations.

In 406, cardless services 108 may determine a list of suitable ATMs. The list of ATMs may be determined on the basis of proximity, distance, and a range of other factors. Cardless services 108 may consider the current location of mobile device 102 to determine those ATMs that are in a close proximity. Cardless services 108 may further consider past behaviors of the account holder in fashioning the list, e.g., frequently visited ATMs, walking/driving habits, etc.

In 408, cardless services 108 may provide the list of ATMs to the account holder for viewing. In an embodiment, the account holder may select an ATM from the list. In another use case, the account holder may not select the ATM, but may instead visit the ATM and scan a QR code displayed by the ATM. Cardless services 108 may present the determined ATMs in a map-view, such as the wireframe portrayed in FIG. 2F. However, in other embodiments, the list of ATMs may be provided in a list, table, or other suitable format. Cardless services 108 may provide filtering, sorting, ordering, etc. of the ATMs in the list of ATMs. Additionally, cardless services 108 may include an indication of the available denominations at each ATM as provided as real-time or near-real-time data by ATM middleware 112 and/or micro-service repository 106. Cardless services 108 may display the denominations along with a count of the available denominations or an indicator of availability (i.e., yes/no, thumbs up/down, etc.).

In 410, cardless services 108 may employ denomination logic 109 to receive the desired denominations from the account holder, i.e., the denomination request. The denomination request may specify the number of $5 bills, $10 bills, $20 bills, $50 bills, $100 bills, etc. to receive as part of the withdrawal. Although the foregoing lists dollars, other currencies and denominations may be included in the denomination request. Denomination logic 109 may employ a suitable user interface to receive these denominations, and one such interface is described above with reference to FIG. 2E. In the context of a location-driven denomination request, denomination logic 109 may limit the denominations that may be selected to those that are available at the selected ATM.

In 412, an account holder with mobile device 102 approaches ATM 114 and scans a barcode, QR code, or other suitable label at the ATM using the mobile application. Such a barcode may encode or otherwise include some form of identifier for the ATM. As previously discussed, this barcode may be, for example, a QR code, although a skilled artisan would appreciate that other methods of encoding an identifier for the ATM may be used and other methods of transmitting the same to the mobile app may also be used. The mobile application may then send the ATM identifier to QR match service 110 to determine a unique identifier for the ATM.

In 414, cardless services 108 may request processing of a queued transaction at the ATM associated by employing ATM middleware 112. Cardless services 108 may further interact with backend banking systems to complete the transaction, in embodiments and use cases where an ATM visit is not required.

In this fashion, a withdrawal may be provided to the account holder matching a denomination request without requiring the account holder to present an ATM card and PIN number at the ATM. Moreover, the system may tailor the denominations available in the denomination request to those denominations that are available at the user-selected or proximate ATM.

Figure 5:
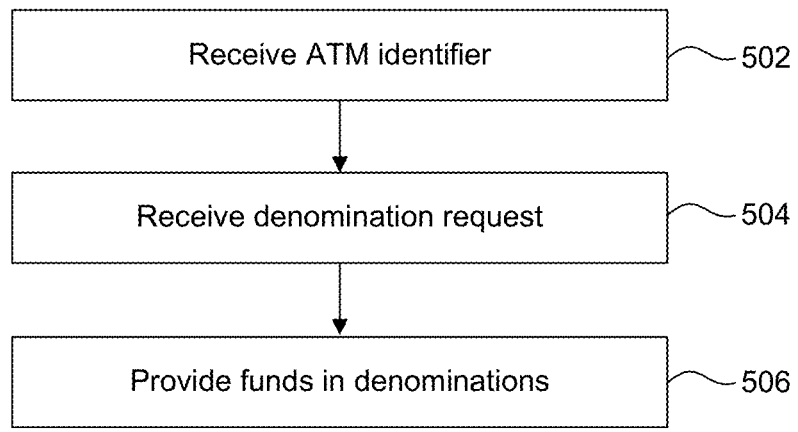
FIG. 5 illustrates a method of receiving a scan-driven request to withdraw funds in a cardless ATM system, in accordance with an embodiment.

FIG. 5 illustrates a method 500 of receiving a scan-driven request to withdraw funds in a cardless ATM system, in accordance with an embodiment. In the scan-driven request approach, cardless services 108 may receive an ATM identifier from a mobile application, for example, from a mobile application that scans a QR code displayed by an ATM that encodes the identifier and interfaces with QR match service 110 to determine the unique identifier. Denomination logic 109 then receives a denomination request that limits the denominations to the scanned ATM. Method 500 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 5, as will be understood by a person of ordinary skill in the art(s).

In 502, an account holder with mobile device 102 may approach ATM 114 and scan a barcode, QR code, or other suitable label at the ATM using the mobile application. Such a barcode may encode or otherwise include some form of identifier for the ATM. As previously discussed, this barcode may be, for example, a QR code, although a skilled artisan would appreciate that other methods of encoding an identifier for the ATM may be used and other methods of transmitting the same to the mobile app may also be used. The mobile application may then send the ATM identifier to cardless services 108.

In 504, may employ denomination logic 109 to receive the desired denominations from the account holder, i.e., the denomination request. The denomination request may specify the number of $5 bills, $10 bills, $20 bills, $50 bills, $100 bills, etc. to receive as part of the withdrawal. Although the foregoing lists dollars, other currencies and denominations may be included in the denomination request. Denomination logic 109 may employ a suitable user interface to receive these denominations, and one such interface is described above with reference to FIG. 2E. In the context of a scan-driven denomination request, denomination logic 109 may limit the denominations that may be selected in the denomination request to those denominations that are available at the ATM identified in the scanned QR code.

In 506, cardless services 108 may request processing of a queued transaction at the ATM associated by employing ATM middleware 112. Cardless services 108 may further interact with backend banking systems to complete the transaction, in embodiments and use cases where an ATM visit is not required.

In this fashion, an account holder may create a denomination request specific to a visited ATM by scanning a QR code at the ATM. The account holder may subsequently receive a withdrawal in the desired denominations without presenting an ATM card and PIN number.

Figure 6:
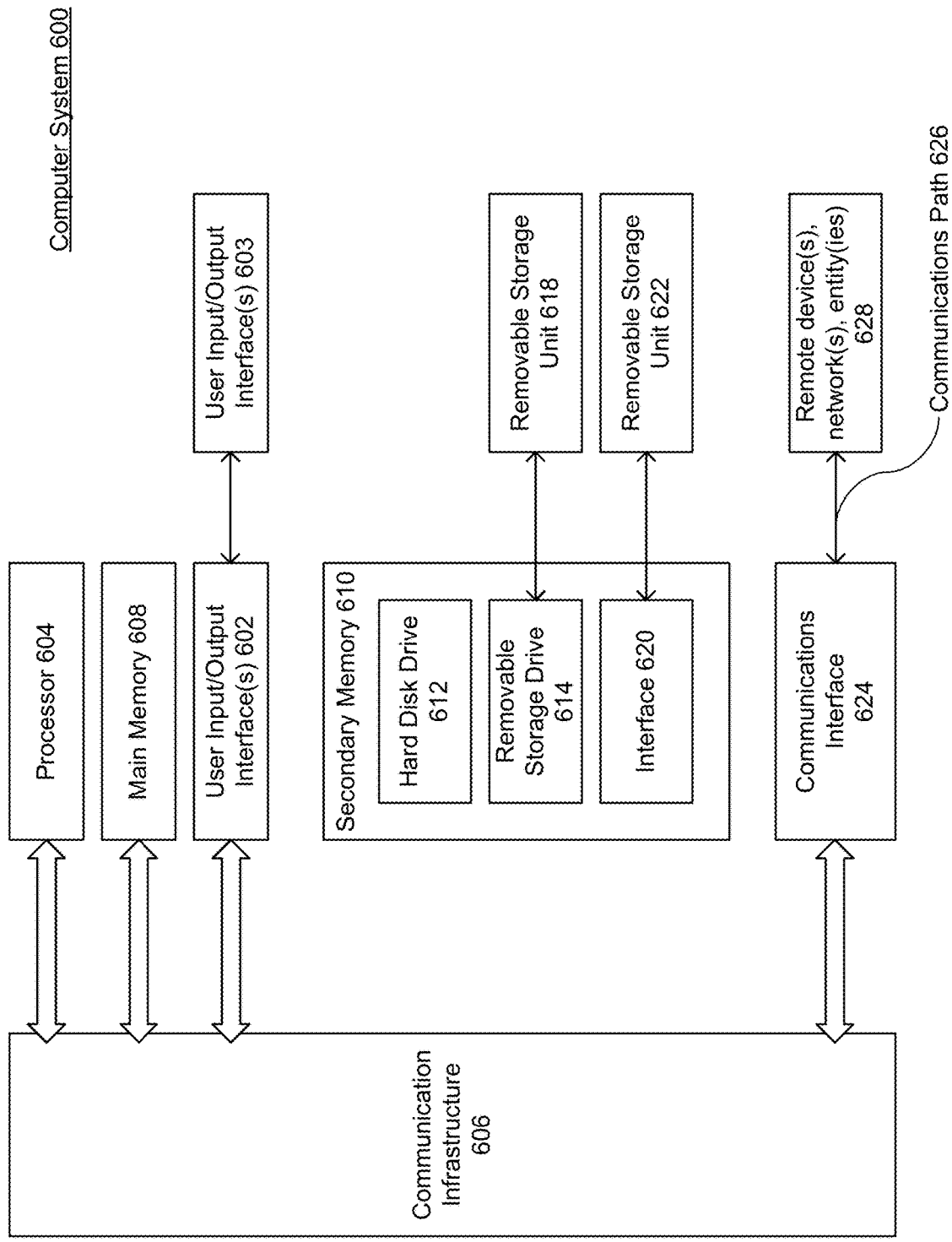
FIG. 6 is an example computer system useful for implementing various embodiments.

Various embodiments may be implemented, for example, using one or more well-known computer systems, such as computer system 600 shown in FIG. 6. One or more computer systems 600 may be used, for example, to implement any of the embodiments discussed herein, as well as combinations and sub-combinations thereof.

Computer system 600 may include one or more processors (also called central processing units, or CPUs), such as a processor 604. Processor 604 may be connected to a communication infrastructure or bus 606.

Computer system 600 may also include user input/output device(s) 608, such as monitors, keyboards, pointing devices, etc., which may communicate with communication infrastructure 606 through user input/output interface(s) 602.

One or more of processors 604 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 600 may also include a main or primary memory 608, such as random access memory (RAM). Main memory 608 may include one or more levels of cache. Main memory 608 may have stored therein control logic (i.e., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 may include a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 may read from and/or write to removable storage unit 618.

Secondary memory 610 may include other means, devices, components, instrumentalities or other approaches for allowing computer programs and/or other instructions and/or data to be accessed by computer system 600. Such means, devices, components, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 may enable computer system 600 to communicate and interact with any combination of external devices, external networks, external entities, etc. (individually and collectively referenced by reference number 628). For example, communication interface 624 may allow computer system 600 to communicate with external or remote devices 628 over communications path 626, which may be wired and/or wireless (or a combination thereof), and which may include any combination of LANs, WANs, the Internet, etc. Control logic and/or data may be transmitted to and from computer system 600 via communication path 626.

Computer system 600 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 600 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 600 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 6. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer implemented method, comprising:
receiving, by one or more computing devices, an identifier for a visited ATM from a mobile application on a mobile device, wherein the identifier is encoded in a quick response (QR) code displayed on a display of the visited ATM that can be scanned by the mobile device;
determining, by the one or more computing devices, available denominations at the visited ATM;
providing, by the one or more computing devices, a denomination request form to the mobile application such that the denomination request form allows the mobile application to create a request to withdraw funds comprising a withdrawal amount,
wherein the request to withdraw funds specifies one or more denominations for the withdrawal amount, and
wherein the denomination request form limits the denominations that can be specified in the request to withdraw funds to the available denominations at the visited ATM; and
in response to receiving the request to withdraw funds, causing, by the one or more computing devices, the visited ATM to provide the withdrawal amount in the one or more denominations specified in the denomination request.

2. The method of claim 1, further comprising:
providing, by the one or more computing devices, one or more ATMs to the mobile application based on a location of the mobile device.

3. The method of claim 2, further comprising:
receiving, by the one or more computing devices, a selected ATM from the one or more ATMs from the mobile application, wherein the denomination request form limits the denominations that can be specified in the request to withdraw funds to the available denominations at the selected ATM.

4. The method of claim 2, further comprising:
receiving, by the one or more computing devices, a selected ATM from the one or more ATMs from the mobile application; and
sending, by the one or more computing devices, a notification to the mobile application if the visited ATM is not the selected ATM.

5. The method of claim 4 further comprising:
receiving, by the one or more computing devices, from the mobile application, a confirmation to proceed with the visited ATM that is not the selected ATM prior to directing the visited ATM to provide the withdrawal amount in the one or more denominations specified in the denomination request.

6. The method of claim 1, further comprising:
providing, by the one or more computing devices, a list of ATMs to the mobile application that includes denominations available in each ATM in the list of ATMs.

7. The method of claim 1, wherein the QR code is a barcode.

8. A system, comprising:
a memory; and
at least one processor coupled to the memory and configured to:
receive an identifier for a visited ATM from a mobile application on a mobile device, wherein the identifier is encoded in a quick response (QR) code displayed on a display of the visited ATM that can be scanned by the mobile device;
determine available denominations at the visited ATM;
provide a denomination request form to the mobile application such that the denomination request form allows the mobile application to create a request to withdraw funds comprising a withdrawal amount, wherein the request to withdraw funds specifies one or more denominations for the withdrawal amount, and wherein the denomination request form limits the denominations that can be specified in the request to withdraw funds to the available denominations at the visited ATM; and
in response to receiving the request to withdraw funds, cause the visited ATM to provide the withdrawal amount in the one or more denominations specified in the denomination request.

9. The system of claim 8, the at least one processor further configured to:
provide one or more ATMs to the mobile application based on a location of the mobile device.

10. The system of claim 9, the at least one processor further configured to:
receive a selected ATM from the one or more ATMs from the mobile application, wherein the denomination request form limits the denominations that can be specified in the request to withdraw funds to the available denominations at the selected ATM.

11. The system of claim 8, the at least one processor further configured to:
receive a selected ATM from the one or more ATMs from the mobile application; and
send a notification to the mobile application if the visited ATM is not the selected ATM.

12. The system of claim 11, the at least one processor further configured to:
receive from the mobile application a confirmation to proceed with the visited ATM that is not the selected ATM prior to directing the visited ATM to provide the withdrawal amount in the one or more denominations specified in the denomination request.

13. The system of claim 8, the at least one processor further configured to:
provide a list of ATMs to the mobile application that includes denominations available in each ATM in the list of ATMs.

14. The system of claim 8, wherein the QR code is a barcode.

15. A non-transitory computer-readable device having instructions stored thereon that, when executed by at least one computing device, causes the at least one computing device to perform operations comprising:
receiving an identifier for a visited ATM from a mobile application on a mobile device, wherein the identifier is encoded in a quick response (QR) code displayed on a display of the visited ATM that can be scanned by the mobile device;
determining available denominations at the visited ATM;
providing a denomination request form to the mobile application such that the denomination request form allows the mobile application to create a request to withdraw funds comprising a withdrawal amount, wherein the request to withdraw funds specifies one or more denominations for the withdrawal amount, and wherein the denomination request form limits the denominations that can be specified in the request to withdraw funds to the available denominations at the selected ATM; and
in response to receiving the request to withdraw funds, causing the visited ATM to provide the withdrawal amount in the one or more denominations specified in the denomination request.

16. The non-transitory computer-readable device of claim 15, further comprising:
providing one or more ATMs to the mobile application based on a location of the mobile device.

17. The non-transitory computer-readable device of claim 16, further comprising:
receiving a selected ATM from the one or more ATMs from the mobile application, wherein the denomination request form limits the denominations that can be specified in the request to withdraw funds to the available denominations at the selected ATM.

18. The non-transitory computer-readable device of claim 15, further comprising:
providing a list of ATMs to the mobile application that includes denominations available in each ATM in the list of ATMs.

19. The non-transitory computer-readable device of claim 15, further comprising:
receiving from the mobile application a confirmation to proceed with the visited ATM that is not the selected ATM prior to directing the visited ATM to provide the withdrawal amount in the one or more denominations specified in the denomination request.

20. The non-transitory computer-readable device of claim 15, wherein the QR code is a barcode.

* * * * *